United States Patent Office 2,911,260
Patented Nov. 3, 1959

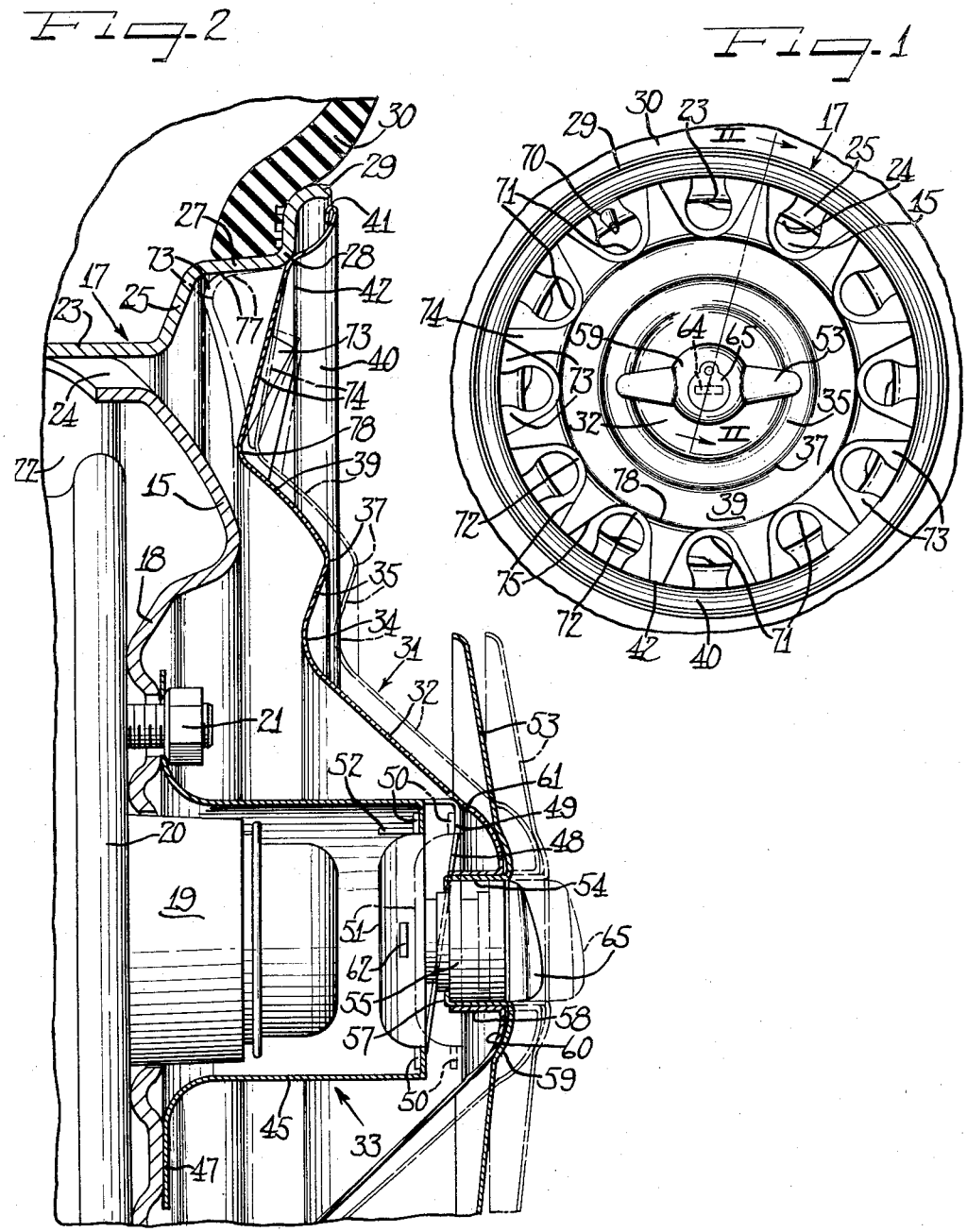

2,911,260

WHEEL COVER

George Albert Lyon, Detroit, Mich.

Original application September 5, 1952, Serial No. 308,013, now Patent No. 2,729,510, dated January 3, 1956. Divided and this application December 29, 1955, Serial No. 556,136

10 Claims. (Cl. 301—37)

The present invention relates to improvements in wheel structures and more particularly concerns the ornamental and protective covering of the outer sides of vehicle wheels.

This application is a division of my copending application Serial No. 308,013 filed September 5, 1952, now Patent No. 2,729,510 issued January 3, 1956.

An important object of the present invention is to provide an improved ornamentally and protectively covered wheel structure in which substantially the entire outer side of the wheel is covered.

Another object of the invention is to provide in a vehicle wheel structure an improved cover arrangement wherein the cover is held securely in place against rattling or turning.

A further object of the invention is to provide an improved cover construction for vehicle wheels wherein attachment of the cover to the wheel is at the center of the cover, but the margin of the cover makes effective gripping engagement against the tire rim for holding the cover against tendency to turn due to torque stresses in service.

Still another object of the invention is to provide improved means in a full disk-type of cover for preventing any tendency of the outer margin of the cover to slap or chatter in service on a wheel, although the cover is secured at a central portion of the wheel.

It is also an object of the invention to provide in a centrally latched wheel cover means cooperative with the wheel adjacent the margin of the cover for effecting air circulation through the cover and air circulation openings in the wheel.

Yet another object of the invention is to provide improved structures for effectuating the foregoing and other objects of the present invention.

Other objects, features and advantages of the present invention will be readily apparent from the following detailed description of a preferred embodiment thereof taken in conjunction with the accompanying drawing, in which:

Figure 1 is an outer side elevational view of a vehicle wheel structure embodying features of the invention; and Figure 2 is a fragmentary radial sectional detail view taken substantially on the line II—II of Figure 1.

In the present instance, the invention is disclosed as applied to a vehicle wheel including a wheel body 15 and a tire rim 17. The wheel body 15 may be of the stamped metal disk spider type including a central bolt-on flange 18 which is centrally apertured to accommodate an axle hub 19 to project therethrough. The bolt-on flange is secured to an axle hub flange 20 by means of attachment bolts 21.

At its outer margin the wheel body 15 is provided with a generally axially inwardly extending marginal attachment flange 22 secured in any suitable manner to a base flange 23 of the tire rim. At suitable intervals the base flange 22 is inset to afford air circulation openings 24 through the wheel between the attachment flange and the base flange of the tire rim.

The tire rim 17 is of the multi-flanged drop center type having at its outer side merging with the base flange 23 and extending generally radially outwardly a side flange 25. Extending generally axially outwardly and sloping slightly radially outwardly from juncture with the side flange 25 is an intermediate flange 27 which in turn merges on a juncture shoulder 28 with a terminal flange 29. The construction of the tire rim is such as to support operatively a pneumatic tire 30.

For covering the outer side of the wheel a novel cover structure 31 is provided. This cover may be made from a suitable thin gauge sheet metal such as stainless steel or brass that can be conveniently stamped or drawn to shape on a mass production basis and which affords a substantial degree of resiliency in the finished product. The outer side of the cover may be finished in any preferred manner such as by lustrous polishing, plating and polishing, or painting, or a combination of finishes.

By preference, the cover 31 comprises a one-piece disk body having a central portion 32 overlying the central portion of the wheel body 15 and arranged to be secured to the wheel body by attachment mechanism 33.

Herein, the cover body 32 comprises a more or less frusto-conical wide angle crown portion sloping generally radially outwardly and axially inwardly to an annular axially inwardly directed rib 34 of substantial radius from which the crown body portion angles divergently and generally radially outwardly and axially outwardly to provide an annular area 35 merging with a convex cross-sectioned annular axially outwardly projecting rib 37. At its radially outer side, the rib 37 joins a generally inwardly dished annular intermediate cover portion 39 arranged to overlie the juncture area between the tire rim and the wheel body and connected at its radially outer side to a convex annular reenforcing marginal portion 40 arranged to overlie the terminal flange 29 of the tire rim 17 and having its extremity turned under to provide a reenforcing and finishing bead 41. At juncture of the intermediate and outer marginal portions is an indented annular rib shoulder 42 that is of a diameter to engage against the tire rim shoulder 28. The construction and relationship is such that when the cover is applied to the outer side of the wheel, the cover shoulder 42 engages the rim shoulder 28 as a flexure fulcrum or bottoming stop while the central portion 32 of the cover is moved flexibly and under resilient tension further axially inwardly into retained engagement with the attachment mechanism 33.

In a desirable construction, the cover retaining structure 33 comprises a cover retaining, tensioning and locking arrangement. To this end, a tubular post-like adapter member 45 is provided of a large enough internal diameter to fit about the axle hub structure 19, and having a lateral base flange 47 to rest against the bolt-on flange 18 of the wheel and equipped with bolt apertures matching the bolt apertures in the bolt-on flange so that the wheel attaching bolts 21 will serve also to attach the adapter post 45 concentrically to the wheel body 15.

The outer end of the adapter post is provided with a pair of symmetrically arranged inwardly directed, generally spirally sloping cam flanges 48 each of which has at its high or axially outermost end a slightly turned up entry or receiver lip 49 to facilitate engagement behind the cam flange of respective diametrically oppositely extending interengagement and take-up lugs or dogs 50 on a rotatable latching member 51 carried by the central or crown portion 32 of the cover. The arrangement is such that as an incident to centering the cover 31 on the wheel, the latching lugs 50 can be engaged behind the cam flanges 48 by turning the latch member 51 to swing the latch lugs behind the cam flanges past the entry lips 49. In Figure 2 the dash outline position of the cover and latching mechanism indicates the relative position of the cover to the adapter post 45 when the latching lugs 50 are ready to be turned into the cam flanges 48, while the full line position indicates the position of the cover after the latching member 51 has been turned to cause the latching lugs 50 to cam inwardly along the inner faces of the cam flanges 48 to draw the cover axially inwardly into tensioned, retaining engagement with the wheel. The fully tensioned condition of the cover is determined by engagement of the latching lugs 50 with respective stop flanges 52 extending axially inwardly from the inner end portions of the respective cam flanges 48.

Means for manually turning the latch member 51 comprises a handle member 53 having a tubular axially inwardly central attachment flange 54 which is secured in gripping engagement with an annularly undercut barrel extension 55 on the latching member, the inner terminal portion of the flange 54 comprising an inturned interlock flange 57 engaging a shoulder of the barrel. The tubular flange 54 extends in rotatably slidable relation through an axially inwardly directed central supporting and guide flange 58 on the cover crown 32. The handle has a hub shoulder 59 that bears axially inwardly against a central crown protuberance 60 on the crown portion of the cover immediately radially outwardly from the flange 58. In the finally tensioned, full take-up position of the cover crown, a shoulder 61 on the crown may bottom against the axially outward shoulder extremity of the adapter post 45, with the latching lugs 50 placed under tension against the cam flanges 48 for holding the crown portion of the cover against axial vibration relative to the adapter post 45.

To prevent unauthorized removal of the cover from the wheel, the latching mechanism may include a suitable key-operated lock that may be housed in the barrel 55 and the latch member 51 and including a radially protractable and retractable locking finger or tongue 62 which is preferably disposed to project from the latch member 51 midway between the two latching lugs 50, that is 90°, removed from the latching lugs. For receiving the locking finger or bolt 62 in either of the diametrically opposite positions, the wall of the hollow post member 45 is provided with suitable interlock or keeper openings. At its outer end, the barrel 55 has a keyhole 64 which may be protectively closed against dirt in service by means of a laterally swingable closure plate member 65. It will thus be observed that mounting and removal of the cover 31 can be easily and manually effected through the medium of the handle 53.

In mounting the cover, it is brought into centered relation to the wheel with the marginal shoulder 42 in engagement with the tire rim, and the cover is then pressed inwardly and the handle 53 turned to drive latching lugs 50 in inwardly camming engagement with the cam flanges 48 until the lugs 50 drive against the stop flanges 52, whereupon the cover will have been thoroughly axially inwardly resiliently tensioned. Then the cover can be locked against unauthorized removal by means of a key (not shown) by which the bolt 62 is locked into the adjacent one of the keeper openings. Removal of the cover entails merely a reversal of the procedure just outlined.

According to the present invention to afford not only improved air circulation through the cover and the wheel openings 24, but also to provide for holding the cover 31 against turning on the wheel so as to maintain the cover oriented with respect to a valve stem 70, the intermediate cover portion 39, and more particularly the radially outer annular section of such portion is provided with an annular series of openings 71 from which generally axially inwardly directed respective flanges 72 are struck and afford air circulation promoting tabs or flanges or vanes and tire rim engaging shoulder members 73.

By preference the flange portions 73 are of generally lobe-like wing shape joined at their radially inner ends by a connecting portion of the flange 72 so that the wing flanges are in mutually resiliently tensioned relation by pairs at each of the openings 71. It will be observed that the openings 71 are of progressively increasing width radially inwardly so that spoke-like portions 74 between the openings are of gradually diminishing width from juncture at the rib 42 to juncture with the radially inner section of the intermediate cover portion 39. The flanges 72 marginally join the adjacent portions of the cover and more particularly the intermediate spoke-like portions 74 on rigidifying juncture ribs 75. Thereby the resilience of the spoke-like portions 74 of the cover is enhanced.

At their radially outermost generally axially extending edges, the lobe-like wing portions 73 provide respective generally radially outwardly facing thrust shoulders 77 which normally extend to a diameter such as to enable reasonably easy initial application of the cover 31 into generally telescoping opposition to the tire rim intermediate flange 27 in the initial application of the cover to the wheel, substantially as shown in dot dash position in Figure 2. By preference this initial relationship is such that the shoulder edges 77 of the wing flanges 73 slightly diverge generally radially and axially inwardly relative to the tire rim intermediate flange 27 from centering engagement of the axially outermost portions of the flange shoulders 77 adjacent juncture thereof with the cover rib 42 with the intermediate flange 27 adjacent the rim shoulder 28.

Then, upon application of the radially inward pressure against the crown portion 32 of the cover and axially inward tensioning flexible displacement of the cover, the vane flange shoulders 77 are caused to thrust radially outwardly against the rim intermediate flange 27 substantially throughout the axial length of the flange shoulder as the margin of the cover fulcrums about the fulcrum rib 42. Thereby the shoulder edges 77 grippingly engage against the tire rim intermediate flange 27 under resilient tension to hold the marginal portion of the cover against vibration or turning.

It will be observed that the lobe flanges 73 are angularly directed substantially convergently toward one another whereby to enhance the anti-turn engagement of the edges 77 against the tire rim flange for resisting torque stresses in either rotary direction.

In addition, of course, the shoulder vane flanges 73 provide air circulation promoting vanes at the openings 71 to enhance movement of air through the cover and the ventilation or air circulation openings 24 in the wheel.

It will be observed that the resilient spoke portions 74 extend generally radially and axially outwardly from a juncture fulcrum 78 at the radially outer edge of the intermediate cover portion 39 and that such juncture shoulder or rib 78 is disposed radially inwardly relative to the wheel openings 24 so that the cover openings 71 lie opposite the wheel openings 24.

Upon removal of the cover by turning the handle 53 to release the cover from the latching mechanism 33, the resilient cover will spring out from the full line position of Figure 2 to the dot dash position shown and thereby release the lobe flange portions 73 from gripping engagement with the tire rim intermediate flange 27, so that the cover may then be easily lifted away from the wheel.

It will be understood that modifications and variations may be effected without departing from the scope of the novel concepts of the present invention.

I claim as my invention:

1. In a wheel structure including a wheel body and a tire rim, a cover for disposition at the outer side of the wheel including a central portion for attachment to the wheel body under axially inward deflection of the cover, and a radially outer portion for overlying the tire rim and serving as a flexure fulcrum, with an intermediate portion generally radially slotted and provided at the slots with turned-in flange portions having generally radially outwardly facing shoulder edges engageable with an opposing tire rim flange incident to axially inward deflection of the cover fulcruming about said fulcrum.

2. In a wheel structure including a wheel body and a tire rim, a cover for disposition at the outer side of the wheel including a central portion for attachment to the wheel body under axially inward deflection of the cover, and a radially outer portion for overlying the tire rim and serving as a flexure fulcrum, with an intermediate portion generally radially slotted and provided at the slots with turned-in flange portions having generally radially outwardly facing shoulder edges engageable with an opposing tire rim flange incident to axially inward deflection of the cover fulcruming about said fulcrum, said edge shoulders being disposed for generally divergent relation to the rim flange initially and before said deflection and then being arranged to cant into the engagement with said rim flange as a result of said deflection and fulcruming.

3. In a wheel structure including a tire rim and a wheel body, the wheel body having at the center thereof cover retaining means, a cover for disposition at the outer side of the wheel including an axially flexible body having means at the center thereof for engagement with said retaining means to draw the cover axially inwardly, the cover having at the outer margin thereof means for engaging the tire rim and serving as a flexure fulcrum, said cover having radially inwardly from said flexure fulcrum a series of generally radially extending slots with vanes projecting generally radially and axially and engageable with the tire rim incident to flexure fulcruming of the cover as aforesaid.

4. In a wheel structure including tire rim and wheel body parts with air circulation openings adjacent juncture thereof, a cover for disposition at the outer side of the wheel including a body having means at the center thereof for inwardly axial flexure of the cover and attachment thereof to the wheel body, and a radially outer portion engageable as a flexure fulcrum with the tire rim, with an intermediate portion of the cover having generally radial slots with inturned air circulation promoting vanes engageable with the tire rim as an incident to the inward flexure for holding the cover against rattling and against turning on the wheel.

5. In a wheel structure including tire rim and wheel body parts with air circulation openings adjacent juncture thereof, a cover for disposition at the outer side of the wheel including a body having means at the center thereof for inwardly axial flexure of the cover and attachment thereof to the wheel body, and a radially outer portion engageable as a flexure fulcrum with the tire rim, with an intermediate portion of the cover having generally radial slots with inturned air circulation promoting vanes engageable with the tire rim as an incident to the inward flexure for holding the cover against rattling and against turning on the wheel, said openings being generally opposite the wheel openings for ready air circulation through the cover and the wheel.

6. In a wheel structure including a central part having wheel cover retaining means and a drop center multi-flanged rim including an intermediate flange, a wheel cover having an inwardly extending annular flange portion fastened to said retaining means, and an annular portion intermediate the outer periphery and the annular flange portion and telescoping into said flanged rim, said last named portion having a plurality of generally radially outwardly projecting tabs bent therefrom and extending inwardly and axially with generaly axially extending edges thereof for engagement with said intermediate flange, said tabs being respectively oppositely circumferentially angled and grippingly thrusting against the intermediate flange relatively opposite to one another and thereby acting to prevent rotation of the cover in either opposite rotary direction relative to the wheel.

7. In a wheel structure including a central part having wheel cover retaining means and a drop center multi-flanged rim including an intermediate flange, a wheel cover having an inwardly extending annular flange portion fastened to said retaining means, and an annular portion intermediate the outer periphery and the annular flange portion and telescoping into said flanged rim, said last named portion having a plurality of generally radially outwardly projecting tabs bent therefrom and extending inwardly and axially with generally axially extending edges thereof for engagement with said intermediate flange, said tabs being respectively oppositely circumferentially angled and acting to prevent rotation of the cover relative to the wheel, said annular cover portion having openings therein from which said tabs have been bent and one of said openings affording access to a valve stem on the wheel and being held in registration with the valve stem by the holding of the cover against turning as aforesaid.

8. In a wheel structure including a central part having wheel cover retaining means and a drop center multi-flanged rim including an intermediate flange, a wheel cover having an inwardly extending annular flange portion fastened to said retaining means, and an annular portion intermediate the outer periphery and the annular flange portion and telescoping into said flanged rim, said last named portion having a plurality of generally radially outwardly projecting tabs bent therefrom and extending inwardly and axially with generally axially extending edges thereof for engagement with said intermediate flange, the cover having generally axially and radially outwardly relative to said tabs a shoulder that is engageable with the tire rim for defining axially inward disposition of the radially outer margin of the cover.

9. In a wheel structure including a central part having wheel cover retaining means and a drop center multi-flanged rim including an intermediate flange, a wheel cover having an inwardly extending annular flange portion fastened to said retaining means, and an annular portion intermediate the outer periphery and the annular flange portion and telescoping into said flanged rim, said last named portion having a plurality of generally radially outwardly projecting tabs bent therefrom and extending inwardly and axially with generally axially extending edges thereof for engagement with said intermediate flange, the cover having generally axially and radially outwardly relative to said tabs a shoulder that is engageable with the tire rim for defining axially inward disposition of the radially outer margin of the cover, said fastening of the cover to the wheel effecting generally axially inwardly tensioned force on the cover and fulcruming the radially outer part of the cover about said shoulder for thereby moving the tabs radially outwardly and driving said tab edges under tension toward and into biting engagement with the intermediate flange.

10. In a wheel structure including a wheel body and a tire rim with means on the wheel body for retaining a cover member in place on the wheel, a cover member for disposition over the outer side of the wheel including means at the center thereof for interengagement with said retaining means on the wheel body, said cover member having radially spaced solid circular portions for respectively overlying the wheel body and the tire rim and an intermediate radially slotted portion connecting said solid portions, and generally horseshoe shaped generally axially inwardly extending vane flanges pressed from said slots comprising generally radially projecting vane portions spaced apart at each slot and connected together at the radially inner ends of the respective slots by integral continuous yoke portions whereby to enhance the resiliency of the generally radially projecting vane portions, said vane portions having radially outwardly projecting edges thereon engageable with an opposing portion of the tire rim when the cover member is in the retained position on the wheel as effected by said retaining means of the wheel body and the cover member.

References Cited in the file of this patent

UNITED STATES PATENTS

| | | |
|---|---|---|
| 550,723 | Morgan | Dec. 3, 1895 |
| 2,092,975 | Hunt et al. | Sept. 14, 1937 |

OTHER REFERENCES

Brake Service, vol. 21, No. 5, page 14, May 1951.